United States Patent

Sundström

Patent Number: 5,438,900
Date of Patent: Aug. 8, 1995

[54] LOW NOISE SAW BLADE

[75] Inventor: Erik Sundström, Sandviken, Sweden

[73] Assignee: Sandvik AB, Sandviken, Sweden

[21] Appl. No.: 85,084

[22] Filed: Jul. 2, 1993

[30] Foreign Application Priority Data

Jul. 6, 1992 [SE] Sweden ............... 9202081

[51] Int. Cl.6 .......................... B23D 61/02
[52] U.S. Cl. .......................... 83/835; 83/676
[58] Field of Search ............ 83/835, 854, 855, 838, 83/836, 837, 846, 847, 848, 849, 850, 851, 852, 653, 676

[56] References Cited

U.S. PATENT DOCUMENTS

| | | |
|---|---|---|
| 464,855 | 12/1891 | Clark ............... 83/835 |
| 1,723,843 | 8/1929 | Chapin . |
| 2,013,943 | 9/1935 | Allen . |
| 3,981,216 | 9/1976 | Lemmon . |
| 4,574,676 | 3/1986 | Jansen-Herfeld ........ 83/835 |
| 4,776,251 | 10/1988 | Carter, Jr. ............. 83/835 |

FOREIGN PATENT DOCUMENTS

| | | |
|---|---|---|
| 0376676 | 7/1990 | European Pat. Off. ...... 83/835 |
| 3232778 | 3/1984 | Germany . |
| 3310247 | 10/1984 | Germany . |
| 3330956 | 3/1985 | Germany . |
| 3804400 | 8/1989 | Germany . |
| 0292118 | 12/1990 | Japan ............. 83/835 |
| 0763090 | 9/1980 | U.S.S.R. .......... 83/835 |

OTHER PUBLICATIONS

English Abstract of Japanese Publication No. JP 4002410, corresponding to European Patent Application No. 93850119.4., Apr. 9, 1992.

Primary Examiner—Eugenia Jones
Assistant Examiner—Allan M. Schrock
Attorney, Agent, or Firm—Burns, Doane, Swecker & Mathis

[57] ABSTRACT

A circular saw blade is disclosed with narrow radial slots to avoid tangential stress. In order to lower the noise level and the cracking failure risk, a narrow arcuate cutout is provided in the direction of the slot adjacent to at least one end which cutout is not continuous with the slot. The parts of the cutout closest to the slot comprise at least one of the ends of the cutout, and the distance from the slot end to the nearest end of the cutout is less than the blade thickness.

11 Claims, 1 Drawing Sheet

LOW NOISE SAW BLADE

BACKGROUND AND SUMMARY OF THE INVENTION

It has long been known to make circular saw blades according to patents U.S. Pat. No. 1,723,843 and U.S. Pat. No. 2,013,943 with substantially radial slots, which may start at the inner or outer perimeter of the blade, or may be located wholly within the blade surface.

The main purpose of the slots is to avoid tangential stresses since tangential compressive stress at the outer perimeter or tangential tensile stress at the inner perimeter will make the saw blade liable to buckling or vibration even at low speed. Such buckling or vibration may also occur when the tooth area is heated in use.

To minimize the risk of fatigue cracks at the ends of the slots which may later spread to other parts of the blades, the ends of the slots are made with a shape to lower the stress concentration factor, such as round holes with a diameter larger than the slot width as in U.S. Pat. No. 1,723,843, or narrow curved cutouts continuous with the straight slot and curving more than half a circle according to the patents DE 32 32 778 and DE 33 30 956.

The detailed shape of the slots can be varied to influence the generation and damping of noise. In an idling saw blade, the noise is mainly aerodynamic whistling in the slots and the gullets between teeth. To minimize whistling, the volume of the gullets and slots should have a small volume, and the stress lowering holes can be filled with some deformable substance as shown in U.S. Pat. No. 3,981,216. The slots can be positively inclined to avoid additive coupling between the gullet whistling and the slot whistling according to U.S. Pat. No. 1,723,843, or negatively inclined to avoid sawdust sticking in the slots according to U.S. Pat. No. 3,981,216.

An active vibration damping can be achieved by making slots with zero width according to U.S. 2,013,943, letting the sides of the slots rub against each other when the blade vibrates, but then the main function of avoiding tangential stress is impaired. It has also been suggested in DE 33 10 247 to let the slot width decrease to zero at its end, locating an open hole some distance from the slot end to catch any crack before it spreads, but since the crack direction is not determined there is still a great risk of spreading to other parts of the blade.

The present invention relates to a saw blade with a type of slot which avoids tangential stresses without the risk of cracks spreading, and which lowers the noise level to low volume by active damping through a previously not utilized effect.

BRIEF DESCRIPTION OF THE DRAWINGS

Preferred embodiments of the present invention will be described with reference to the accompanying drawings, wherein like members bear like reference numerals and wherein.

DETAILED DESCRIPTION OF THE PREFERRED EMBODIMENT

Figure 1:
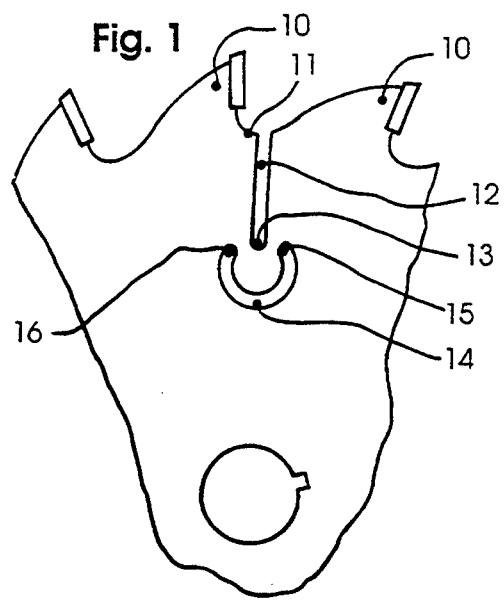
FIG. 1 is a side view of a portion of a circular saw blade according to a first embodiment of the present invention.

The saw blade body 9 has teeth 10 preferentially provided with tips 10a of harder material such as tungsten carbide or diamond. Between the teeth are gullets 11 with a size determined by the amount of chips to be produced. Beneath some of the gullets are located substantially radial slots 12 with a width less than half the blade thickness but at least wide enough so that the edges do not touch at normal operating temperatures. The slots are preferably cut by laser with a width from 0.2 to 1 mm, the width being substantially equal along the whole slot to an end 13. The number of slots is preferably from two to seven, and their length is preferably less than half the radius of the blade.

Figure 2:
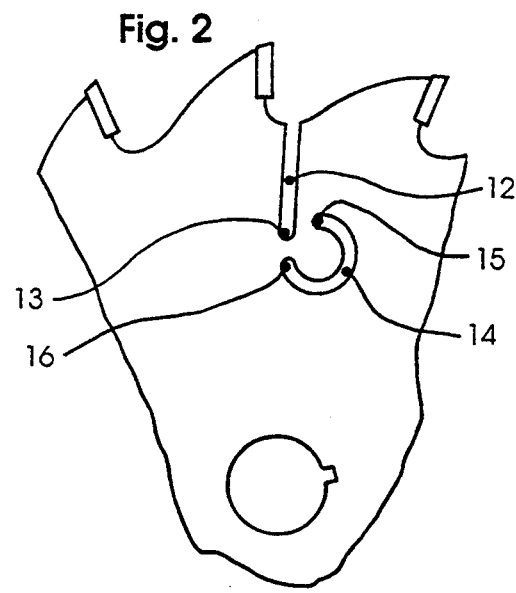
FIG. 2 is a side view of a second embodiment according to the present invention.
Figure 3:
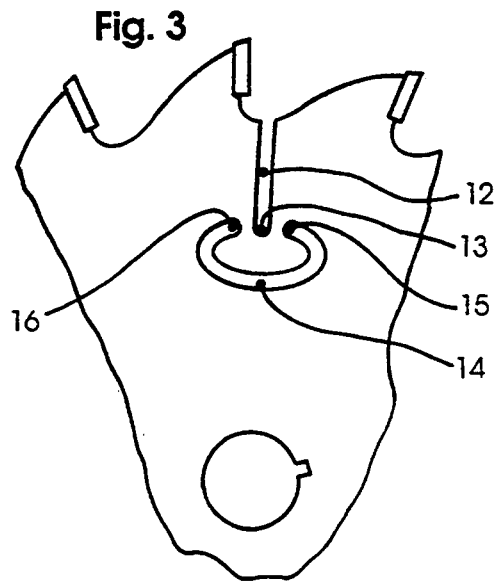
FIG. 3 is a side view of a third embodiment according to the present invention.
Figure 4:
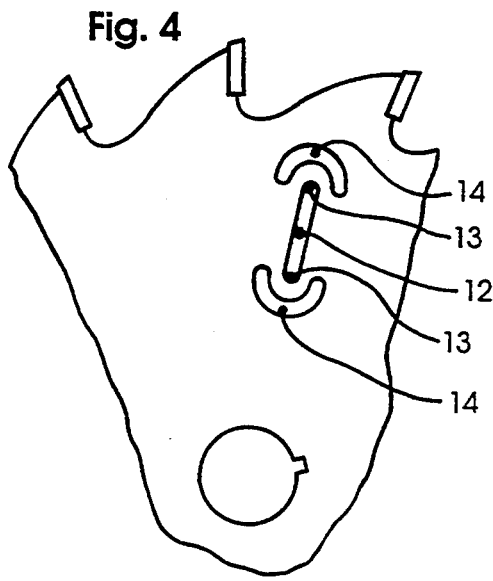
FIG. 4 is a side view of a fourth embodiment according to the present invention.

In the direction of the slot adjacent to the end 13 is a narrow arcuate cutout 14 which is not continuous with the slot 12. The ends 15, 16 of the cutout are located close to the end 13 of the slot but not connected with it, and the rest of the cutout 14 is located at the same or a greater distance from the end 13 of the slot. The distance from the end 13 of the slot 12 to the nearest end 15 of the cutout should not exceed the blade thickness. The cutout 14 is preferably laser cut with a width from 0.2 to 1 mm and a radius of curvature greater than its width. The shape of the arcuate cutout 14 can be part of a circle as shown in FIGS. 1 and 2 or part of an oval as shown in FIG. 3. The cutout 14 can be located symmetrically in relation to the slot 12 as shown in FIGS. 1 and 3, or unsymmetrically as in FIG. 2. The invention has been described above with reference to slots leading from the gullets inward, but the same type of cutouts can be located adjacent to the ends of slots leading from the center hole outwards, with the cutout arranged at the outward end of slot. Alternatively, slots can be provided with both ends within the saw blade body as shown in FIG. 4. In such a case, the cutout 14 can be arranged adjacent one or both ends 13 of the slot 12.

When the saw blade vibrates, the narrow regions of the saw blade located between the end 13 of the slot and the ends 15, 16 of the arcuate cutout 14 are subjected to such high bending stresses that there is a damping energy dissipation. However, these stresses will be more homogeneous than the stresses near a single slot end and will cause less risk of crack initiation. If a crack should start after long use, the direction of the crack will be uniquely determined to lead from the slot end 13 to either of the cutout ends 15, 16 with no likelihood of spreading into other parts of the blade.

A saw blade according to the invention combines in an unique way high damping energy dissipation, avoidance of tangential stresses, low risk of cracking failure and low whistling noise level.

The invention is not restricted to blades with teeth of certain shape or for sawing of certain materials, and can also be utilized on diamond saw blades for sawing of stone or masonry. The invention can also be applied to some of the slots in a blade, the remaining slots being differently shaped.

The principles, preferred embodiments and mode of operation have been described in the foregoing. Variations and changes may be made by others without departing from the scope of the present invention as defined in the claims.

What is claimed is:

1. A circular saw blade comprising a blade body having teeth and gullets therebetween, at least one linear slot in a blade body portion radially inward of the gullets, the slot having first and second ends and having a width less than the blade body thickness all the way between the ends, a narrow arcuate cutout having two ends and extending at least partially in a radial direction of the blade but not being continuous with the slot, the cutout ends being closer to one of the first and second ends of the slot than any other portion of the cutout.

2. The circular saw blade according to claim 1, wherein the arcuate cutout comprises at least one half of a circle.

3. The circular saw blade according to claim 1, wherein the arcuate cutout comprises at least half of an oval.

4. The circular saw blade according to claim 1, wherein the distance from said one of the first and second slot ends to the ends of the arcuate cutout is less than the thickness of the saw blade.

5. The circular saw blade according to claim 1, wherein the at least one slot has both slot ends within the saw blade body portion, the arcuate cutout being provided adjacent said one of the first and second ends of the slot.

6. The circular saw blade according to claim 5, further comprising a second arcuate cutout provided adjacent the other of said first and second ends of the said slot.

7. The circular saw blade according to claim 1, wherein the width of the slot is from 0.2 to 1 mm.

8. The circular saw blade according to claim 1, wherein the width of the slot is less than one half the blade body thickness.

9. The circular saw blade according to claim 1, wherein the radius of curvature of the cutout is greater than its width.

10. The circular saw blade according to claim 1, wherein the other of said first and second ends of the slot opens into one of said gullets of the saw blade.

11. The circular saw blade according to claim 1, wherein a longitudinal axis of the slot extends generally radially within the blade body portion.

* * * * *